Oct. 12, 1965 G. A. BLEYLE, JR 3,211,318
VESSEL FOR CRYOGENIC FLUIDS
Filed May 17, 1963 3 Sheets-Sheet 1

INVENTOR.
Gustave A. Bleyle, Jr.
BY
*Burnie A. Lepper*
Attorney

Oct. 12, 1965   G. A. BLEYLE, JR   3,211,318
VESSEL FOR CRYOGENIC FLUIDS
Filed May 17, 1963   3 Sheets-Sheet 3

INVENTOR.
Gustave A. Bleyle, Jr.
BY
Attorney

United States Patent Office

3,211,318
Patented Oct. 12, 1965

3,211,318
VESSEL FOR CRYOGENIC FLUIDS
Gustave A. Bleyle, Jr., Pacific Palisades, Calif., assignor to Arthur D. Little, Inc., Cambridge, Mass., a corporation of Massachusetts
Filed May 17, 1963, Ser. No. 281,298
11 Claims. (Cl. 220—15)

This invention relates to vessels for handling cryogenic fluids, and more particularly to such vessels which must be adaptable to different environments.

In storing or transporting cryogenic fluids (that is fluids which must be kept at temperatures below about 100° K.) it is customary to use Dewar-type containers which are formed of an inner vessel which is adapted to contain the cryogenic fluid and an outer vessel which substantially completely surrounds it. Between the inner and outer vessels there is defined a vacuum-tight space which is evacuated and which customarily contains an insulating material which together with the vacuum minimizes heat transfer by radiation, convection and conduction from the atmosphere to the cold fluid which may be a liquefied gas or a gas stored under supercritical conditions. In outer space applications it will of course be appreciated that the insulation system must not only be efficient, but it must also be capable of withstanding vibrations and shock as well as being capable of maintaining the interior of the vessel at the necessary low temperatures over an extended period of time.

In order to provide the necessary physical strength to these cryogenic containers and to support the inner and outer vessels in proper relationship it is necessary to place supporting members between the two concentric vessels. In prior art practice these supporting members have always been an integral, unitary mechanical joining between the inner and outer vessels since it is required that these supporting members must remain in physical contact with both the inner and the outer wall to withstand the gravitational forces encountered on earth. In space applications once outside of the earth's gravitational field and atmosphere such supports are no longer required. However, if the vessel is to be landed on a terrestrial body or is to be returned to earth, then these supports are again needed to withstand the shocks and vibrations encountered in landing. Thus varying environments place different requirements upon the structure of cryogenic vessels.

In cryogenic vessels for space missions, extremely low heat leaks are required in order to meet the objectives of most missions. Most of the cryogenic vessels for long-term space missions are of the ultra high vacuum space insulation type described above. In any of these cryogenic containers there are three principal paths for heat leak from the ambient conditions to the interior of the vessel and hence to the cryogenic fluid. One of these paths is through the insulating medium, one through the inner-connecting piping and the third through the mechanical supports that transmit the load of the inner vessel through the vacuum space to the outer vessel. For earth-bound application, the supports are necessary to bear the weight of the inner vessels. However, for space applications in an essentially zero g environment, the insulation and/or the piping connections would be sufficient to center the inner vessel without mechanical supports. Hence it would be highly desirable under these conditions to have a vessel which eliminated the mechanical support heat leak path and thus provide a vessel which was capable of storing cryogenic fluids for longer periods of time than now foreseen.

During takeoff from the earth's environment the inner vessel of the cryogenic container is subject to accelerations and to vibrations; thus the mechanical supports must be designed to carry these forces. These supporting members are traditionally mechanical ties between the inner and outer vessels, they make thermal contact and they are permanent. Thus they continue to contribute heat leaks even in the zero g environment where support is not needed and where heat leaks must be minimized. However, in any application where a return to earth or landing on a terrestrial body is contemplated, supports must of course be provide between the inner and outer vessels when entering the gravitational fields to counteract the forces acting upon the inner vessel and to withstand the mechanical vibrations to which the vessel is subjected in landing. Thus there are presented in the design of cryogenic vessels for space missions the problems of providing supporting means under certain conditions and of minimizing the heat leaks caused by such supporting means under another set of conditions.

I have found that in the practice of this invention it is possible to provide in such vessels a retractable support which allows the inner vessel to be mechanically held and supported during high g loadings and vibrational periods in escaping and re-entering gravitational fields. The rectractable support may be disengaged when no longer needed in such a way to break the heat leak path into the cryogenic material. Such disengagement is achieved when the vessel is exposed to essentially zero g environment and where heat leaks are highly undesirable.

It is therefore a primary object of this invention to provide a novel type of vessel for handling cryogenic fluids which is adaptable to environments of highly varying pressures and gravitational fields. It is another object of this invention to provide such a vessel which is suitable for space missions both for escaping and re-entering the earth's or other gravitational fields. It is yet another object to provide a vessel in the character described which provides greater flexibility in design and operation, taking advantage of zero g conditions and minimize heat leak through structural supports. Other objects of the invention will in part be obvious and will in part be apparent hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

In general, the cryogenic container of this invention may be described as an insulated container adapted to store and transport cryogenic fluids in environments of widely varying external pressures and gravitational fields. It comprises, in combination, an inner vessel adapted to contain the cryogenic fluids; an outer vessel substantially surrounding the inner vessel and defining therewith a vacuum type insulating space around the inner vessel; insulation located within the space; retractable supporting means operable within the evacuated space being adapted when actuated to form a support between the inner and outer vessels; and means external of said outer vessel adapted to actuate the retractable supporting means. In a preferred embodiment of this invention the actuating means comprises a series of blisters affixed to the external wall of the outer vessel through fluid-tight seals and pressure-responsive diaphragms under the blisters which are capable of being flexed by gas pressure built up within the blisters.

In actuation of the retractable supporting means the wall of the outer vessel is flexed inwardly forcing the parts forming the retractable supporting means to make contact and thus provide a mechanical joining between the inner and outer wall to supply the necessary support between these walls to hold them in their spaced relationship when the vessel is subjected to high g's or to vibrations or to a combination of these. However, when it is no longer necessary to supply the supporting force between the walls, the retractable supporting means is disengaged, the heat leak path is broken, and the walls are maintained in spaced relationship entirely through the insulation material and piping connections within the evacuated space.

Figure 1:
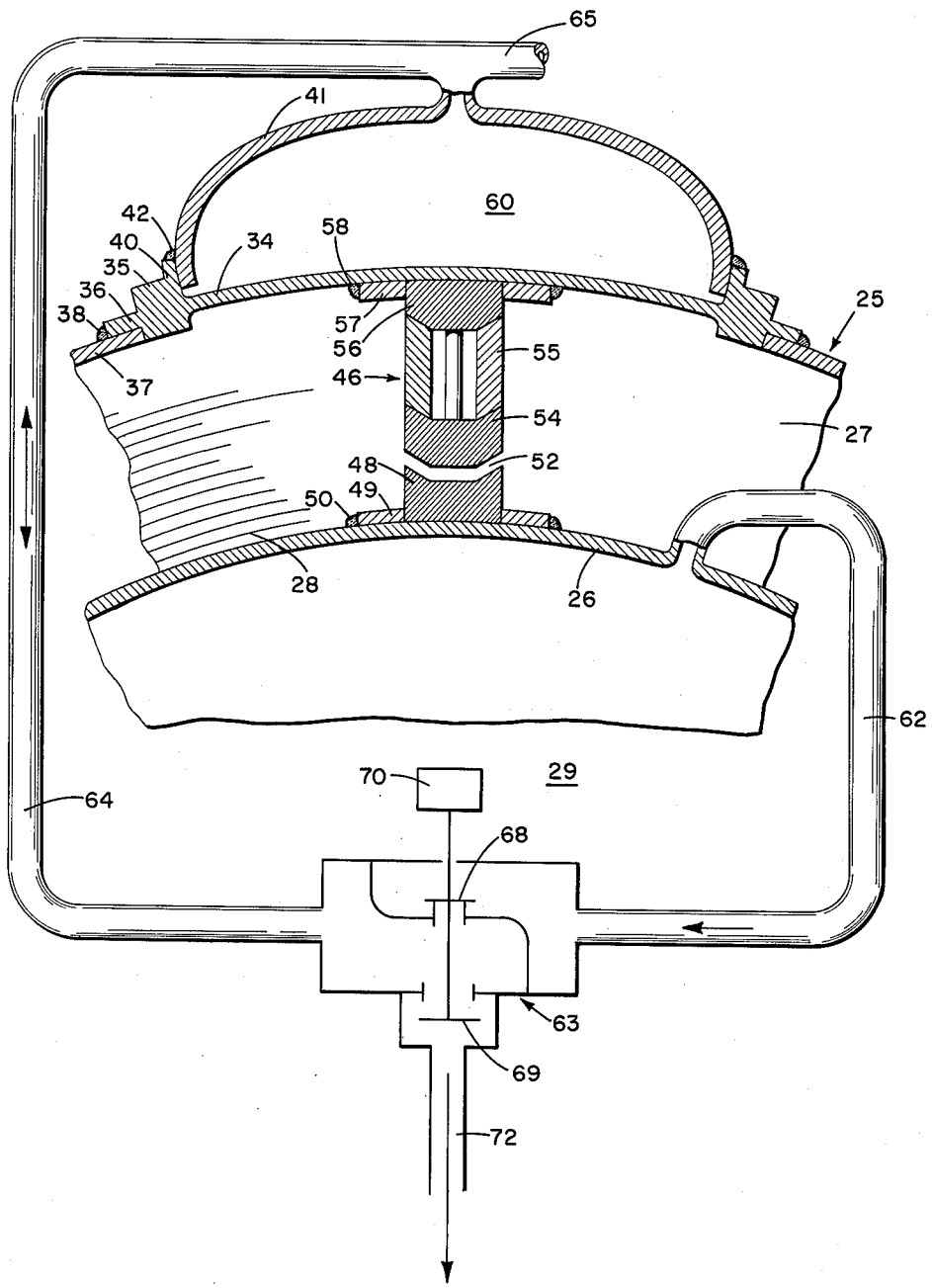
FIG. 1 is a cross-section of part of a vessel constructed in accordance with this invention.
Figure 5:
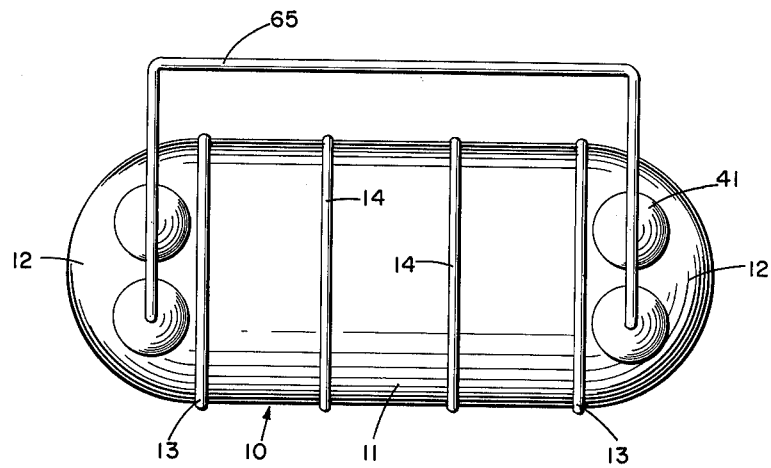
FIG. 5 shows the application of this invention to a typical cylindrical type cryogenic vessel.
Figure 6:
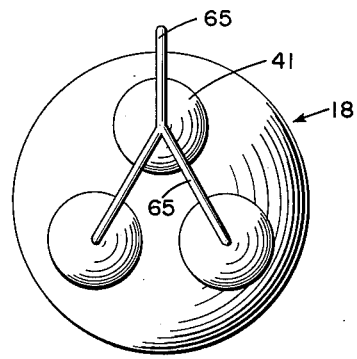
FIG. 6 shows the construction of this invention applied to a typical spherical vessel.

The device of the invention is shown in detail in FIG. 1, but it will be helpful first to turn to FIGS. 5 and 6 to see the type of vessels to which the apparatus of this invention is applicable. FIG. 5 illustrates a typical cylindrical type container which is designated generally by the number 10. It will be seen to be made up of a central cylindrical portion 11 and two hemispherical ends 12, these being joined by suitable vacuum-tight means 13. The central cylindrical portion may be supplied with supporting rings 14. Although supports can be used in the cylindrical section of the container 10 between the inner and outer vessel, they are not usually necessary since supporting means at the hemispherical ends between the vessels are capable of supporting the inner vessel both axially and horizontally. For this reason the actuating devices, represented in FIG. 5 by blisters 41 covering a pressure-responsive diaphragm (not shown) are placed only on the hemispherical ends of the container. The actual number of the actuating means will, of course, be determined by the number of supporting members required and this number may vary widely from one container design to another.

FIG. 6 illustrates a spherical cryogenic container having supports between the inner and outer vessels placed at regular intervals. Over these supports are located the actuating means represented, for convenience, as circular-shaped blisters 41. As in the case of the cylindrical container of FIG. 5, the number and location of the supports may vary, and the gas-tight blister need not be of a circular configuration.

Returning now to FIG. 1 there will be seen the retractable supporting member and one modification of the actuating means constructed in accordance with the practice of this invention. FIG. 1 represents part of a cross-section of a typical cryogenic container such for example as the spherical container 18 of FIG. 6. It will be seen that the cryogenic container is formed of two concentric vessels, an outer vessel 25 and an inner vessel 26 which define between them an evacuated space 27 which normally will contain an insulating material 28, such as spaced radiation shields which may be, for example, alternate layers of thin aluminum foil and coarse cotton cloth. A powdered insulation may be used, as indicated by the numeral 30 in FIG. 2, but the spaced radiation shields are preferred since they are capable of contributing some strength to the system. This insulation in conjunction with the vacuum maintained in the spacing between the vessels is designed to minimize heat transfer through radiation, conduction and convection.

The cryogenic fluid 29 is contained within the inner vessel 26. It may be a liquefied gas, e.g., liquid hydrogen, or a fluid in the supercritical state.

Figure 4:
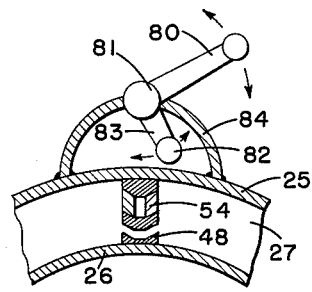
FIG. 4 illustrates another alternate means for actuating the retractable support by mechanical latching.

Periodically spaced over the external surface of the outer vessel are a plurality of diaphragms which are pressure-responsive. One of these is shown in FIG. 1 as a thin section 34 of the outer wall. This thin diaphragm section can be joined to the remaining portion of the outer wall by means of a thick supporting rib 35. The rib itself has a horizontal flange 36 which is sealed to the unmodified portion 37 of the outer vessel wall through suitable soldering 38. In like manner the rib 35 also has a vertical flange 40 which is sealed to the blister wall 41 through suitable means such as solder 42. Blister 41 in turn is designed to cover that portion of the outer wall represented by the diaphragm 34 and to form with it a gas-tight container suitable for the receiving of gas under pressure. Although FIG. 1 illustrates the use of a somewhat thinner outer wall section under the blister than the remaining portion of the outer vessel wall, this is not a requirement since these two wall sections may be of the same thickness. In this latter case, the wall of the outer vessel may then, of course, be formed as a unitary or integral wall, the actuating means being positioned over the retractable supporting means. Such an outer wall is illustrated in FIG. 4.

Between the outer wall 25 and the inner wall 26 under that portion of the outer wall which is represented by the pressure-responsive diaphragm means 34 is the retractable support generally illustrated at 46. In the modification of FIG. 1 it will be seen that this retractable support comprises a receiving groove portion 48 which is joined by suitable collars 49 and sealing 50 to the external wall of the inner vessel.

The position occupied by the retractable support in FIG. 1 is that which it will occupy when the vessel is subjected to zero g loadings, that is, where no support is actually required between the inner and outer walls. In this position there is therefore provided a gap 52 which may contain a small portion of the insulation material (if it is a powder) but which provides for the elimination of any physical contact between the receiving groove portion and the engaging keel portion 54 which will be seen to be mounted on a stack of compressive washers 55 which are annular and designed to minimize heat transfer between the engaging keel portions 54 and a washer support 56 which in turn is permanently affixed to the interior wall of the outer vessel through a collar 57 and suitable solder 58.

The blister 41 defines between it and the diaphragm 34 a volume 60 suitable for containing pressurized gas. Inasmuch as a gas pressure is available either through the boil-off of liquefied gas or by bleeding off a small portion of gas from the fluid stored in the supercritical state, it is convenient to actuate the diaphragm 34 by means of force, that is, by the use of gas pressure. For this purpose there is provided a fluid conduit 62, leading from the interior of the vessel to a fluid control means generally indicated at 63, and a fluid conduit 64 communicating between the control means and the interior volume 60 of the blister. The high pressure gas is conducted by means of conduit 64 into the blister volume 60 and on to the succeeding blisters through conduit 65 as will be apparent in FIGS. 5 and 6.

The fluid control means 63 may consist of any suitable means for controlling the passage of high-pressure gas in one of two alternate directions. For example as shown in FIG. 1 it comprises valve 68 and 69 and a valve control means 70 which may be an automatic-type control responsive to either atmospheric pressure or to predetermined directions. Finally there is also associated with the fluid control means a bleed-off conduit 72 for discharging gas from the blister area 60. In a possible application, such gas may be vented to the spacecraft fuel cells, to its life support systems, or to the atmosphere whichever is desirable.

Figure 2:
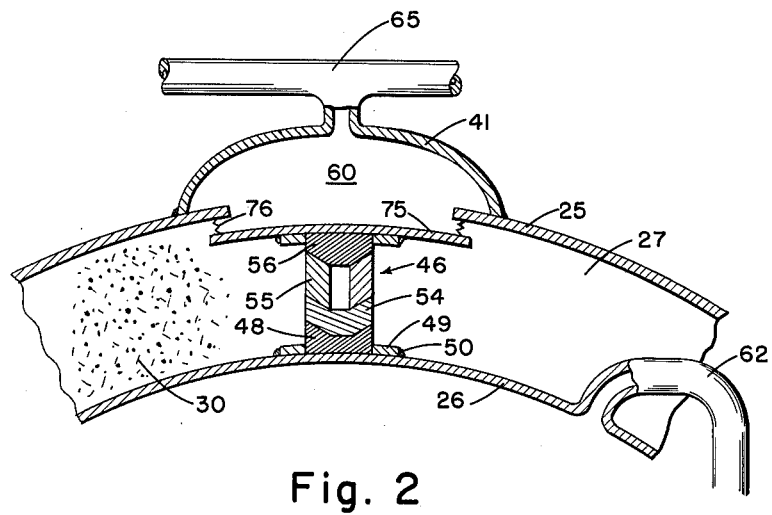
FIG. 2 is a modification of the construction of FIG. 1.

If, in the construction of the outer vessel wall it is desired to construct the portions of the outer wall under the blister which are to serve as the pressure-responsive diaphragms of thinner metal than the remaining portions of the outer vessel wall, then this may conveniently be accomplished by etching out the appropriate portion of the outer vessel wall where it is desired to make the diaphragm 34 of thin construction. It is also, of course, possible to make different types of pressure-responsive diaphragm, such as by the use of bellows as illustrated in FIG. 2 in which like numbers refer to like elements. In this case the thin diaphragm wall 34 has been replaced by a second thin wall 75 which is joined to the outer vessel wall through suitable bellows means 76. This figure illustrates the engaged position of the retractable support, i.e., the position it would occupy when conditions were such as to require the inner vessel to be supported.

Although it will generally be preferable to actuate the diaphragm or outer vessel wall over the support by gas pressure, it is also possible to flex the outer wall inwardly to actuate the supporting means by other mechanisms. Thus, this may be accomplished magnetically or by mechanical means such as levers. A magnetic actuating device is illustrated in FIG. 3 and a mechanical device in FIG. 4.

Figure 3:
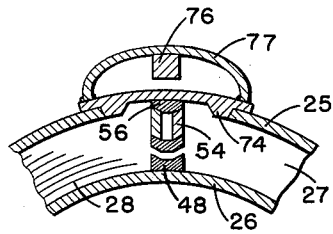
FIG. 3 illustrates one alternate means for actuating the retractable support through the use of a magnet.

In FIG. 3 the actuating means is mounted on an insertable plate 75 which may be prefabricated and sealed to the outer wall 25. On the inner side of plate 75 is permanently affixed the engaging keel portion 54, and the washer support 56 which is of a magnetic material. On the exterior of the plate 75 a magnet 76 is held in place over the washer support 56 by means of a suitable support 77. The magnet 76 is so oriented that its energization will repel the washer support 56, thus causing the keel portion 54 of the supporting means to engage the groove portion and form a completed support. Although the magnets of FIG. 3 may be arranged to disengage the support upon being energized the arrangement whereby energization engages the support is preferable since engagement will generally be required over shorter periods of time than disengagement.

FIG. 4 illustrates another modification of the actuating means. It will be seen that this is a mechanical means comprising a lever arm 80 pivoting around a bearing 81 which moves roller 82 back and forth through arm 83. As lever arm 80 is moved it brings roller 82 in contact with outer vessel wall 25 and forces it inward and thus engages the retractable support. The actuating mechanism is mounted on a support 84 which is affixed to the external wall which in this modification is integral with the remaining portion of the wall defining the outer vessel 25. The roller 82 which exerts the necessary pressure to effect the engagement of the retractable supporting means is so positioned that it will force the upper and lower portions to meet in the required manner.

In the operation of a cryogenic vessel of this invention, it will be necessary of course to engage the retractable support 46 during spacecraft take-off and during that time at which the vessel is exposed to high loading forces and to vibrations. Thus, under these circumstances in the modifications shown in FIGS. 1, 2, 5 and 6 the valve control means 70 will be used to actuate the fluid control means 63 to provide for the flow of high-pressure gas from within the cryogenic vessel by means of conduits 62 and 64 into the blister volume 60 to build up sufficient pressure to cause the engaging keel portion 54 of the retractable support to engage the corresponding receiving groove portion 48 thus making physical contact to provide mechanical support between the inner and outer walls. When the vessel has reached that stage in its travel where the inner support is not longer required, the valve control 70 will actuate the fluid control means 63 to permit the gas stored within the gas volume 60 to bleed off and thus relieve the pressure on the diaphragm 34 permitting the retractable supporting means to separate as illustrated in FIG. 1 and therefore to break any heat leak path which may exist in the support between the inner and the outer vessel walls.

Gas bled off from the blister 60 may be directed in any way desirable, that is, it may be vented to fuel cells of the spacecraft, to its life support system (if the fluid is oxygen) or it may be bled to the atmosphere surrounding the container.

In a similar manner, signals may be sent automatically or manually to energize or de-energize the magnets in the apparatus of FIG. 3, or to move the lever arm of FIG. 4 in an appropriate direction.

In some applications it will be necessary to return a vessel of this type to earth, or to land on another terrestrial body. It will of course then be necessary to provide for engagement of the retractable support during such landings. This, of course, is done by reversing the process described above, that is, the valve control means 70 will actuate the necessary valves within the fluid control means 63 permitting gas again to enter by way of conduits 62 and 64 into the blister area 60 and to build up sufficient pressure to flex the diaphragm 34 inwardly thus making contact between the two portions of the retractable support and supplying the necessary support between the inner and outer walls when loading on the vessel and vibrations make this support necessary. Thus by either manually or by preplanned instructions the support will again be furnished to the inner and outer walls making it possible to bring the vessel again into a gravitational field.

Thus it will be seen from the above description that there is provided a cryogenic storage container which is capable of responding to various gravitational conditions and of operating in these environments to achieve optimum performance. That is, where support between the inner and outer vessels is required it is supplied; and where a break in the heat leak paths is required, this is also provided.

It will thus be seen that the objects set forth above among those made apparent from the preceding description are efficiently attained and since certain changes may be made in the above constructions without departing from the scope of the invention, it is intended that all matter contained in the above description and shown in the accompanying drawings shall be interpreted as illustrative and not in a limiting sense.

I claim:
1. A container for storing and transporting cryogenic fluids in environments of widely varying force fields, comprising in combination
   (a) an inner vessel adapted to contain a cryogenic fluid;
   (b) an outer vessel substantially surrounding said inner vessel and defining therewith a vacuum-tight insulating space around said inner vessel;
   (c) insulation located within said space;
   (d) two-element supporting means having one of said elements retractable, operable within said space and providing, when engaged, positive support between said inner and outer vessels;
   (e) actuating means external of said outer vessel adapted to engage said supporting means by inward flexing of the wall of said outer vessel.

2. Container in accordance with claim 1 wherein said insulation comprises spaced radiation shields.

3. Container in accordance with claim 1 wherein said actuating means for applying gas under pressure to achieve said flexing.

4. Container in accordance with claim 1 wherein said actuating means comprises magnet means adapted to achieve said flexing when energized.

5. Container in accordance with claim 1 wherein said actuating means comprises mechanical lever means.

6. Container in accordance with claim 1 wherein said supporting means comprises receiving groove means affixed to one vessel wall and engaging tongue means affixed to the other vessel wall.

7. A container for storing and transporting cryogenic fluids in environments of widely varying force fields, comprising in combination (a) an inner vessel adapted to contain a cryogenic fluid;
(b) an outer vessel substantially surrounding said inner vessel and defining therewith a vacuum-tight insulating space around said inner vessel;
(c) insulating material located within said space;
(d) a plurality of diaphragms responsive to activation forming a portion of the outer vessel wall and integral therewith and adapted to be flexed inwardly;
(e) means for actuating said diaphragms; and
(f) two-element supporting means having one of said elements retractable, operable within said space between each of said diaphragms and said inner wall and providing, when engaged, positive support between said inner and outer vessels.

8. Container in accordance with claim 7 wherein said actuating means comprise means for applying an external force on said diaphragms.

9. A container for storing and transporting cryogenic fluids in environments of widely varying force fields, comprising in combination
(a) an inner vessel adapted to contain a cryogenic fluid;
(b) an outer vessel substantially surrounding said inner vessel and defining therewith a vacuum-tight insulating space around said inner vessel;
(c) insulating material located within said space;
(d) a plurality of blisters attached to the outer surface of said outer vessel and in fluid-tight seal relationships therewith, the portions of the wall of said outer vessel under said blisters being pressure-responsive diaphragms capable of being flexed inwardly; and
(e) two-element supporting means having one of said elements retractable, operable within said space between each of said diaphragms and said inner wall and providing, when engaged, positive support between said inner and outer vessels.

10. Container in accordance with claim 9 including conduit means communicating between said inner vessel and said blisters and adapted to controllably supply pressurized gas to said blisters.

11. Container in accordance with claim 9 wherein said supporting means comprises receiving groove means affixed to one vessel wall and engaging tongue means affixed to the other vessel wall.

References Cited by the Examiner

UNITED STATES PATENTS

| | | | |
|---|---|---|---|
| 2,256,679 | 9/41 | Kornemann et al. | 220—15 |
| 2,401,606 | 6/46 | Brown | 220—15 |
| 2,992,622 | 7/61 | Maker | 220—15 X |
| 3,071,094 | 1/63 | Leroux | 220—15 X |

THERON E. CONDON, *Primary Examiner.*

GEORGE O. RALSTON, *Examiner.*